Patented July 6, 1948

2,444,752

UNITED STATES PATENT OFFICE 2,444,752

PARTICLES COATED WITH 2,2-BIS-(PARACHLOROPHENYL) - 1,1,1 - TRI-CHLOROETHANE

Edouard H. Siegler, Takoma Park, Md.

No Drawing. Application January 20, 1945,
Serial No. 573,797

1 Claim. (Cl. 167—30)

(Granted under the act of March 3, 1883, as
amended April 30, 1928; 370 O. G. 757)

This application is made under the act of March 3, 1883, as amended by the act of April 30, 1928, and the invention herein described, if patented may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to insecticides and the object thereof is to increase the effectiveness of 2,2 - bis(parachlorophenyl) -1,1,1 - trichloroethane and similar compounds as an insecticide.

Other objects of the invention include the provision of insecticidal compositions that are highly effective and which embody an optimum distribution of the insecticide throughout the composition.

Further objects will be apparent from the following description.

2,2 - bis(parachlorophenyl) - 1,1,1 - trichloroethane is both a stomach poison and a contact insecticide. However, in the ordinary manner in which such insecticides are used, their effectiveness is not utilized to the fullest extent due to the fact that a large percentage of the overall area of the insecticide in the composition is nullified or occluded either by contact with inert ingredients, such as dust carriers, etc., which are necessary for practical application, or by the fact that in solid particles of the material a large portion of each particle is unexposed.

I have found that optimum utilization of 2,2 - bis(parachlorophenyl) -1,1,1 - trichloroethane in an insecticidal composition can be effected by applying it as an external fixed coating on finely divided particles of other materials that may be used as carriers, such as dusts, etc. That is, the coating of 2,2-bis(parachlorophenyl) -1,1,1-trichloroethane is fixed on the surface of each discrete particle of the carrier. In this form, the composition has a far greater insecticidal effect than other forms of compositions containing the same ingredients.

According to the invention, the finely divided particles of any solid material, or materials, used as a base or foundation, and which may be insecticidally active, inert, or otherwise, are coated with 2,2-bis(parachlorophenyl) -1,1,1-trichloroethane. Various methods of coating the particles of the base material with 2,2-bis(parachlorophenyl) -1,1,1-trichloroethane may be used. Two such methods will hereinafter be shown by way of illustration and will be referred to as the fusing method and the solvent method, respectively.

In the fusing method, the insecticide is intimately mixed with the base material, or materials, which are in finely divided form, such as a dust, and then fused as an external coating on the individual fine particles of the base material by means of heat.

In the solvent method, the insecticide is first dissolved in a volatile solvent and this solution is thoroughly mixed with the base material, or materials, the latter being in finely divided form. The solvent is then volatilized, leaving the insecticide coated on the individual particles of the base material.

The coated particles may be used in that form as an insecticidal composition or incorporated in additional carriers, either liquids or dusts, or compounded with other parasiticides in any of the usual ways.

The following table shows comparative results by the apple plug method against newly hatched codling moth larvae, using insecticidal compositions in accordance with the invention as against other forms of insecticides:

| Spray materials and dosage | Number of apple plugs | Percentage of insect mortality |
|---|---|---|
| Pumice, 5 lbs., coated with 2,2-bis(parachlorophenyl)-1,1,1-trichloroethane, 1 lb., in 100 gallons water (fusing method) | 190 | 99 |
| Pumice, 5 lbs., coated with 2,2-bis(parachlorophenyl)-1,1,1-trichloroethane, 1 lb., in 100 gallons water (solvent method) | 178 | 92 |
| Pyrophyllite, 5 lbs., coated with 2,2-bis(parachlorophenyl)-1,1,1-trichloroethane, 1 lb., in 100 gallons water (solvent method) | 100 | 96 |
| Pyrophyllite, 5 lbs., coated with 2,2-bis(parachlorophenyl)-1,1,1-trichloroethane, 1 lb., in 100 gallons water (fusing method) | 104 | 92 |
| Pumice, 5 lbs., mixed and ground with 2,2-bis(parachlorophenyl-1,1,1-trichloroethane, 1 lb., in 100 gallons water | 89 | 77 |
| Pyrophyllite, 5 lbs., mixed and ground with 2,2-bis(parachlorophenyl)-1,1,1-trichloroethane, 1 lb., in 100 gallons water | 100 | 78 |
| 2,2-bis(parachlorophenyl)-1,1,1-trichloroethane, 1 lb., (precipitated) in 100 gallons 20% ethanol solution | 185 | 77 |

The tabulated results show that when 2,2-bis-(parachlorophenyl) - 1,1,1 - trichloroethane was used as a finely divided precipitate only 77% of insect mortality resulted. The same percent of insect mortality was obtained when 2,2-bis(parachlorophenyl) -1,1,1-trichloroethane was mixed and ground with pumice. However when 2,2-bis-(parachlorophenyl) - 1,1,1 - trichloroethane was used as a fixed external coating on the finely ground particles of pumice or pyrophyllite, the effectiveness of the insecticide was greatly increased to 92% and 99%, respectively.

Data for a series of experiments in which insectidically active materials were coated with 2,2 - bis(parachlorophenyl) -1,1,1-trichloroethane are given below:

| Spray materials and dosage | Number of apple plugs | Percentage of insect mortality |
|---|---|---|
| Calcium arsenate, 2 lbs., coated with 2,2-bis(parachlorophenyl)-1,1,1-trichloroethane, ¼ lb., in 100 gallons water (solvent method) | 32 | 44 |
| Calcium arsenate, 2 lbs., mixed and ground with 2,2-bis(parachlorophenyl)-1,1,1-trichloroethane, ¼ lb., in 100 gallons water | 36 | 31 |
| Lead arsenate, 4 lbs., coated with 2,2-bis(parachlorophenyl)-1,1,1-trichloroethane, ¼ lb., in 100 gallons water (solvent method) | 151 | 56 |
| Lead arsenate, 4 lbs., mixed and ground with 2,2-bis(parachlorophenyl)-1,1,1-trichloroethane, ¼ lb., in 100 gallons water | 247 | 45 |
| Lead arsenate, 4 lbs., coated with 2,2-bis(parachlorophenyl)-1,1,1-trichloroethane, ¼ lb., in 100 gallons water (fusing method) | 103 | 44 |
| Lead arsenate, 4 lbs., in 100 gallons water | 96 | 43 |
| 2,2-bis(parachlorophenyl)-1,1,1-trichloroethane, ¼ lb., (precipitated) in 100 gallons 20% ethanol solution | 104 | 31 |

By way of illustrating, the advantage in using an insecticidally active material coated with 2,2-bis(parachlorophenyl) -1,1,1-trichloroethane will be cited: Lead arsenate may be coated with 2,2-bis(parachlorophenyl) - 1,1,1-trichloroethane for use as either a spray or dust on peach trees. Such a spray or dust application would be made for the simultaneous control of two distructive insect pests of the peach, namely, the plum curculio and the oriental fruit moth.

Lead arsenate is more effective than 2,2-bis-(parachlorophenyl)-1,1,1-trichloroethane against the plum curculio, whereas 2,2-bis(parachlorophenyl)-1,1,1-trichloroethane is much superior to lead arsenate in destroying the oriental fruit moth. It follows, therefore, that it is highly advantageous to use lead arsenate coated with 2,2-bis(parachlorophenyl)-1,1,1-trichloroethane for the joint control of these insects.

Having thus described my invention, what is claimed is:

A process comprising intimately mixing a solid material in finely divided form with an insecticidal quantity of 2,2-bis(parachlorophenyl)-1,1,1-trichloroethane and heating the resulting mixture to fuse the said 2,2-bis(parachlorophenyl)-1,1,1-trichloroethane as a continuous external coating on the surfaces of each of the individual particles of said solid material.

EDOUARD H. SIEGLER.

REFERENCES CITED

The following references are of record in the file of this patent:

UNITED STATES PATENTS

| Number | Name | Date |
|---|---|---|
| 2,349,814 | Deonier et al. | May 30, 1944 |
| 2,358,942 | Siegler | Sept. 26, 1944 |

FOREIGN PATENTS

| Number | Country | Date |
|---|---|---|
| 547,874 | Great Britain | Sept. 15, 1942 |